United States Patent
Suzuki et al.

(10) Patent No.: US 9,473,685 B2
(45) Date of Patent: Oct. 18, 2016

(54) IMAGING APPARATUS (71) Applicant: Panasonic Intellectual Property Management Co., Ltd., Osaka (JP)

(72) Inventors: Gaku Suzuki, Osaka (JP); Yasuhiro Nakagai, Osaka (JP); Jin Korekuni, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/613,398

(22) Filed: Feb. 4, 2015

(65) Prior Publication Data
US 2015/0222824 A1 Aug. 6, 2015

(30) Foreign Application Priority Data

Feb. 5, 2014 (JP) ................................ 2014-020036

(51) Int. Cl.
*H04N 5/232* (2006.01)
*H04N 5/225* (2006.01)
*G03B 7/00* (2014.01)

(52) U.S. Cl.
CPC ............... *H04N 5/232* (2013.01); *G03B 7/00* (2013.01); *H04N 5/2254* (2013.01)

(58) Field of Classification Search
CPC ....... H04N 5/232; H04N 5/2254; G03B 7/00
See application file for complete search history.

(56) References Cited

U.S. PATENT DOCUMENTS

| 6,072,958 | A  | * | 6/2000 | Hasuda ..................... | G03B 7/10 396/235 |
| 7,699,545 | B2 | * | 4/2010 | Namai ...................... | G03B 9/10 396/483 |
| 2004/0101299 | A1 | * | 5/2004 | Matsumoto .............. | G03B 9/08 396/452 |
| 2012/0229698 | A1 | * | 9/2012 | Tsubono .............. | H04N 5/2353 348/363 |
| 2014/0176747 | A1 | * | 6/2014 | Shintani ............. | H04N 5/23241 348/220.1 |
| 2015/0131986 | A1 | * | 5/2015 | Aoshima .................. | G03B 7/00 396/463 |

FOREIGN PATENT DOCUMENTS

JP 2011-164331 8/2011

* cited by examiner

*Primary Examiner* — Jason Flohre
(74) *Attorney, Agent, or Firm* — Wenderoth, Lind & Ponack, L.L.P.

(57) ABSTRACT

Provided is an imaging apparatus that can shoot at a specified frame speed during continuous shooting. The imaging apparatus in the present disclosure is an imaging apparatus for performing continuous shooting at a specified frame speed, the imaging apparatus including an imaging element configured to generate image data by imaging an object image, a mechanical shutter configured to control an exposure for the imaging element, a frame speed detector configured to detect a frame speed of the continuous shooting, and a control section configured to perform a read operation of the image data and control of the mechanical shutter. The control section adjusts the frame speed of the continuous shooting when a difference between the specified frame speed and the frame speed of the continuous shooting exceeds a predetermined range.

7 Claims, 7 Drawing Sheets

IMAGING APPARATUS

BACKGROUND

1. Technical Field

The present disclosure relates to a shutter drive of an imaging apparatus capable of continuous shooting.

2. Description of the Related Art

PTL 1 discloses a technology that enables shortening a capturing interval when a plurality of still images is obtained by performing a continuous shooting with a digital camera.

CITATION LIST

Patent Literature

PTL 1: Unexamined Japanese Patent Publication No. 2011-164331

SUMMARY

The present disclosure provides an imaging apparatus that can shoot at a specified frame speed during continuous shooting.

The imaging apparatus in the present disclosure is an imaging apparatus for performing continuous shooting at a specified frame speed, the imaging apparatus including an imaging element configured to generate image data by imaging an object image, a mechanical shutter configured to control an exposure for the imaging element, a frame speed detector configured to detect a frame speed of the continuous shooting, and a control section configured to perform a read operation of the image data and control of the mechanical shutter. The control section adjusts the frame speed of the continuous shooting when a difference between the specified frame speed and the frame speed of the continuous shooting exceeds a predetermined speed range.

According to the present disclosure, it is possible to provide an imaging apparatus which keeps constant the continuous shooting frame speed that changes each time the user uses the imaging apparatus due to mechanical fatigue and the like.

DETAILED DESCRIPTION

In the following, exemplary embodiments will be described in detail with reference to the drawings. However, a detailed description more than necessary may be omitted. For example, there may be omitted a detailed description of the already well-known matters and a duplicate description of substantially the same structure. This is to avoid that the following description is unnecessarily redundant, and to facilitate the understanding of those skilled in the art.

It should be noted that the inventors of the present invention provide the accompanying drawings and the description below so that those skilled in the art fully understand the present disclosure, and do not intend to limit the subject matter described in the claims by these.

First Exemplary Embodiment

In the following, the first exemplary embodiment will be described with reference to FIGS. 1-7.

1. Configuration

[1-1. Configuration of Digital Camera]

Figure 1:
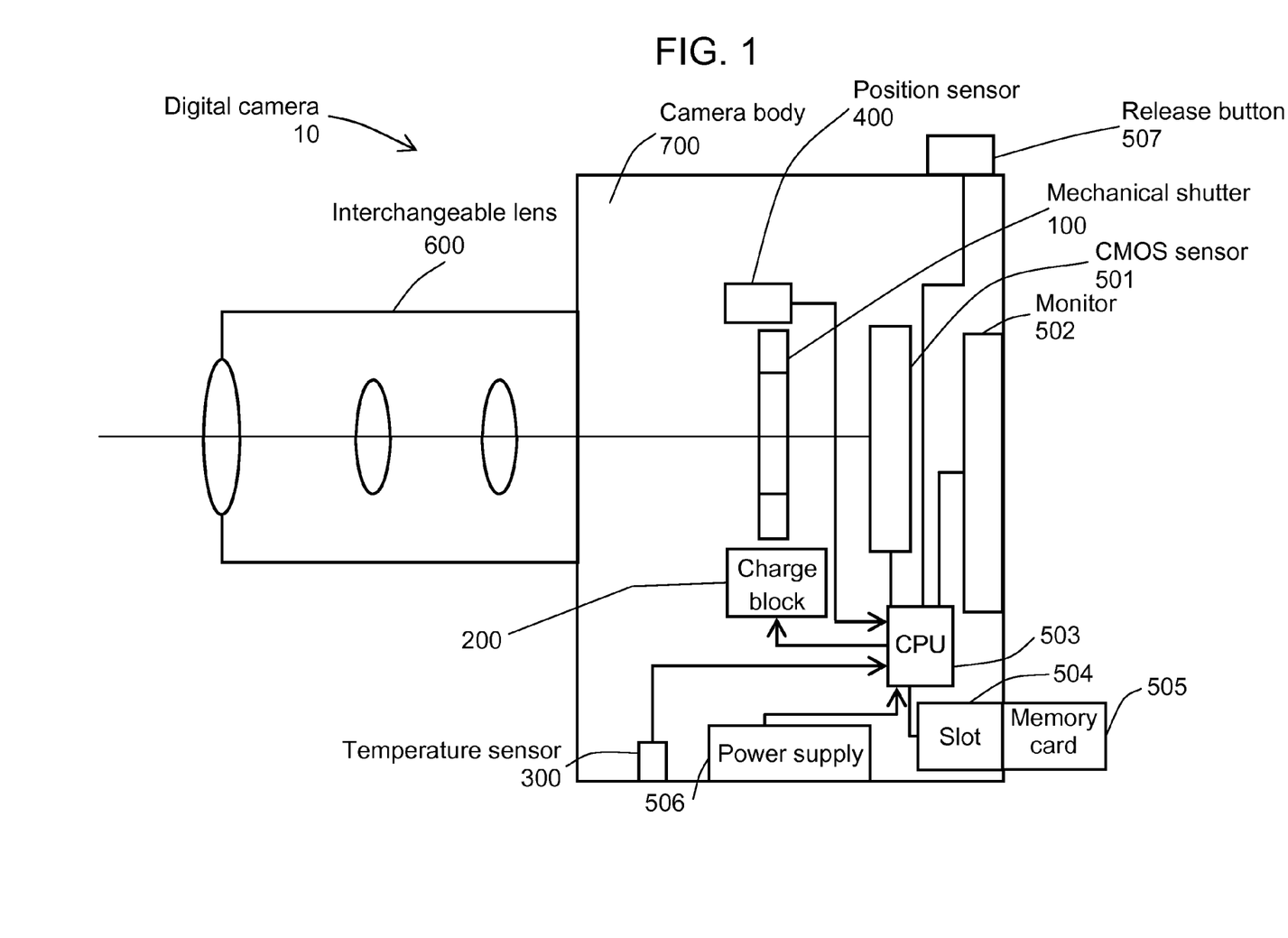
FIG. 1 is an electrical configuration diagram of a digital camera in a first exemplary embodiment.

FIG. 1 is a diagram illustrating a main part of the electrical configuration of digital camera 10. Digital camera 10 includes interchangeable lens 600, and camera body 700. Camera body 700 includes mechanical shutter 100, charge block 200, temperature sensor 300, position sensor 400, CMOS sensor 501, monitor 502, CPU 503, slot 504 into which memory card 505 is inserted, power supply 506, and release button 507.

Interchangeable lens 600 is a detachable lens to the camera body. Interchangeable lens 600 includes an optical system such as a zoom lens, a focus lens, a shake correction lens, and an iris. The Interchangeable lens includes a drive unit configured to drive the optical system.

Temperature sensor 300 is an apparatus configured to detect the environment temperature of digital camera 10. Temperature sensor 300 can be implemented by using a thermistor or the like.

Position sensor 400 is disposed in the position where it can be detected that a front curtain and a rear curtain of mechanical shutter 100 have moved to a predetermined position. Position sensor 400 can be implemented by a photo interrupter.

CMOS sensor 501 generates image data from the optical image of an object formed by interchangeable lens 600 by photoelectric conversion. CMOS sensor 501 can obtain a still image data and a moving image data. The obtained moving image data is also used for displaying a through image.

Monitor 502 displays the image data obtained from CMOS sensor 501. In addition, monitor 502 can also display the capturing conditions, the operation menu, and the like of digital camera 10 along with image data. Monitor 502 can be implemented by a liquid crystal display and the like.

CPU 503 controls the whole of digital camera 10. In addition, CPU 503 includes an internal memory for recording information and the like necessary for capturing. CPU 503 may be configured by a hard-wired electronic circuit, or a microcomputer and the like.

Slot 504 detachably mounts memory card 505. Slot 504 controls memory card 505 based on the control signal transmitted from CPU 503. Specifically, slot 504 can store image data in memory card 505. In addition, slot 504 can output the image data from memory card 505.

Power supply 506 supplies the electric power required for operating digital camera 10 as a whole. Power supply 506 may be, for example, a dry battery, or a rechargeable battery.

In addition, power supply 506 may be a power supply supplying the power supplied from the outside by a power cord to digital camera 10.

Release button 507 is a two-stage operation button. When the user performs a half-push operation on release button 507, CPU 503 performs the focus processing at a predetermined position in the image. When the user performs a full-push operation on release button 507, CPU 503 controls the exposure for CMOS sensor 501 by driving mechanical shutter 100. Then, CPU 503 stores the image data in memory card 505. When digital camera 10 is set in the continuous mode, the image data at a predetermined time interval is continuously recorded in memory card 505 while the user pushes release button 507.

[1-2. Configuration of Shutter Unit]

Figure 2A:
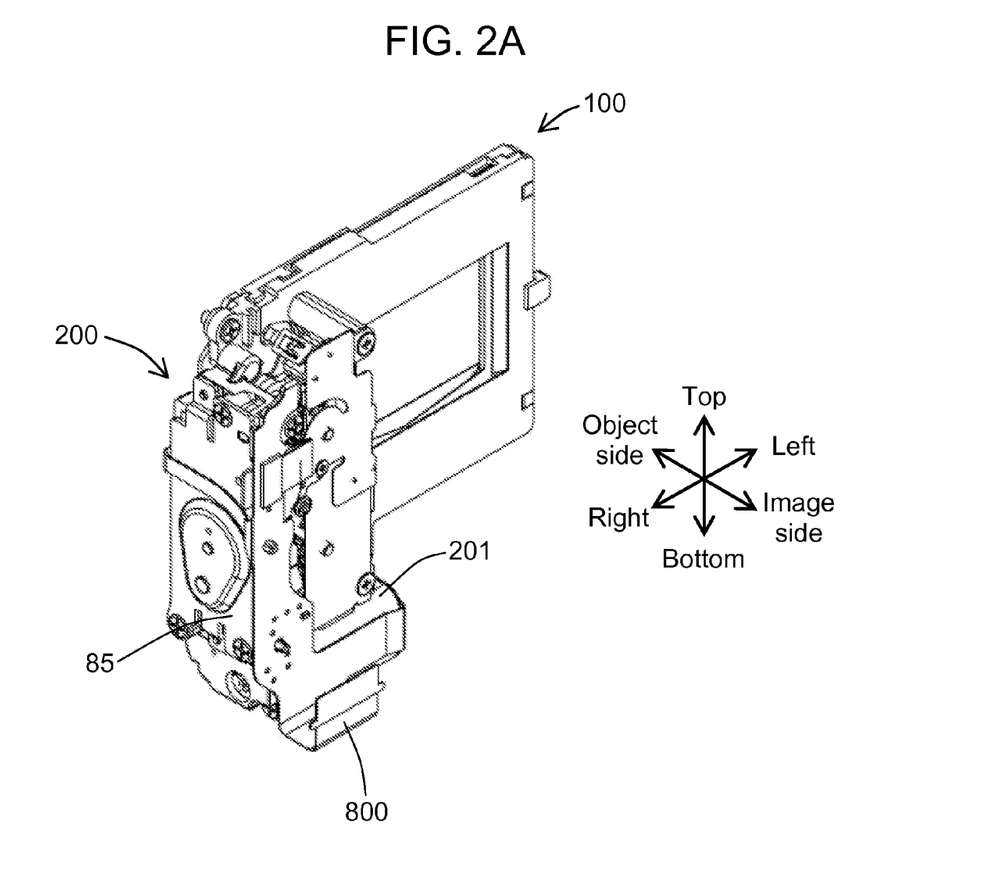
FIG. 2A is a perspective view of a shutter unit of the digital camera in the first exemplary embodiment.
Figure 2B:
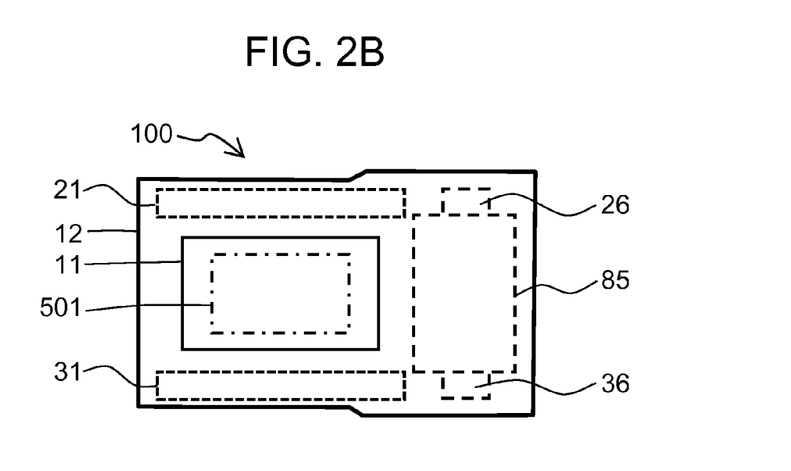
FIG. 2B is a schematic view of a mechanical shutter seen from the object side in the first exemplary embodiment.

FIG. 2A is a perspective view of mechanical shutter 100 and charge block 200. FIG. 2B is a schematic view of mechanical shutter 100 seen from the object side.

Mechanical shutter 100 is a general focal plane shutter having a front curtain and a rear curtain. Mechanical shutter 100 includes base member 12 having opening 11, front curtain 31, rear curtain 21, and charge block 200.

Opening 11 is a hole through which light passes provided in mechanical shutter 100. When mechanical shutter 100 is seen from the object side, CMOS sensor 501 is disposed behind opening 11.

Rear curtain 21 is movably disposed in the vertical direction in mechanical shutter 100. Rear curtain 21 is movably supported in the vertical direction by shutter driving mechanism 85. In addition, front curtain 31 is movably disposed in the vertical direction in mechanical shutter 100. Front curtain 31 is movably supported in the vertical direction by shutter driving mechanism 85. Although rear curtain 21 is retracted above opening 11, and front curtain 31 is retracted below opening 11 in the present exemplary embodiment, the arrangement of rear curtain 21 and front curtain 31 may be reversed.

Rear curtain electromagnet 26 is an electromagnet. Rear curtain electromagnet 26 assumes an energized state and a non-energized state. When one end of rear curtain 21 is attracted and held, rear curtain electromagnet 26 assumes the energized state. When rear curtain electromagnet 26 is in the non-energized state, one end of rear curtain 21 is not attracted to rear curtain electromagnet 26. Rear curtain electromagnet 26 controls the holding state of rear curtain 21 by switching the energized state and the non-energized state.

Front curtain electromagnet 36 is an electromagnet. Front curtain electromagnet 36 assumes an energized state and a non-energized state. When one end of front curtain 31 is attracted and held, front curtain electromagnet 36 assumes the energized state. When front curtain electromagnet 36 is in the non-energized state, one end of front curtain 31 is not attracted to front curtain electromagnet 36. Front curtain electromagnet 36 controls the holding state of front curtain 31 by switching the energized state and the non-energized state.

Charge block 200 includes shutter driving mechanism 85, charge motor 201, and flexible cable 800.

Shutter driving mechanism 85 movably supports rear curtain 21 and front curtain 31 with respect to mechanical shutter 100. Shutter driving mechanism 85 includes a front curtain traveling spring, a front curtain setting spring, a rear curtain traveling spring, a rear curtain setting spring, and a drive lever (not shown). The front curtain traveling spring applies to rear curtain 21 the elastic force for causing rear curtain 21 to travel upwards. The front curtain setting spring applies to rear curtain 21 the elastic force for causing rear curtain 21 to travel downwards. The elastic force of the front curtain traveling spring is greater than the elastic force of front curtain setting spring, and therefore, rear curtain 21 can travel upwards against the elastic force of the front curtain setting spring. The rear curtain traveling spring applies to front curtain 31 the biasing force for causing front curtain 31 to travel upwards. The drive lever is rotatably supported with respect to charge block 200. When the drive lever is driven, the front curtain traveling spring and the rear curtain traveling spring are compressed, and the elastic force for causing rear curtain 21 and front curtain 31 to travel is charged. The charging operation described above is performed by winding up charge motor 201.

Charge motor 201 provides a driving force to shutter driving mechanism 85. The gears (not shown) provided to charge motor 201 mesh with the gears (not shown) in shutter driving mechanism 85. By charge motor 201 being wound up, the charging operation of shutter driving mechanism 85 is performed. Charge motor 201 can be implemented by, for example, a DC motor. Charge motor 201 is controlled by CPU 503.

In flexible cable 800, a circuit pattern is configured, and temperature sensor 300 is implemented. Flexible cable 800 is connected to CPU 503, position sensor 400, and the like. Flexible cable 800 can be implemented by a flexible printed circuit (FPC) and the like with excellent flexibility.

It should be noted that digital camera 10 is an example of the imaging apparatus. CMOS sensor 501 is an example of the imaging element. Mechanical shutter 100 is an example of the mechanical shutter. CPU 503 is an example of the control section, the frame speed detector, and the recording unit. Temperature sensor 300 is an example of the temperature detector. Front curtain 31 and rear curtain 21 are an example of the curtain. Shutter driving mechanism 85 is an example of the driving mechanism. Charge motor 201 is an example of the motor.

2. Operation

[2-1. Mechanical Shutter Drive During Capturing Operation]

Figure 3A:
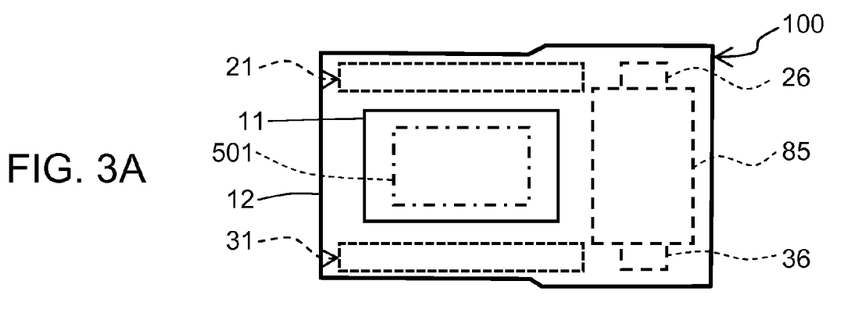
FIGS. 3A to 3D are diagrams illustrating the operation of the mechanical shutter in the first exemplary embodiment.
Figure 3B:
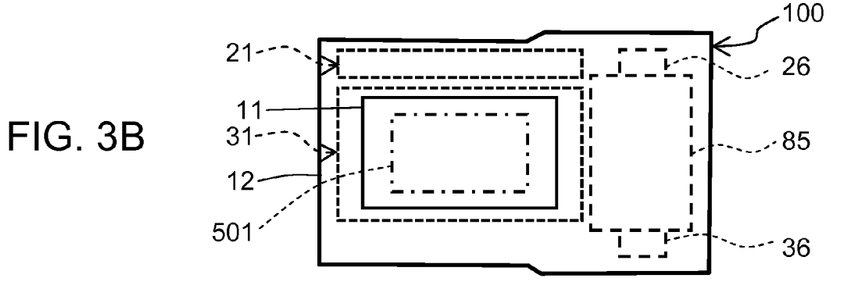
Figure 3C:
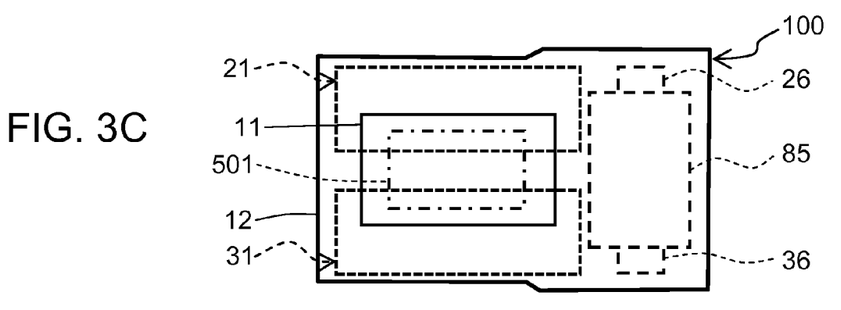
Figure 3D:
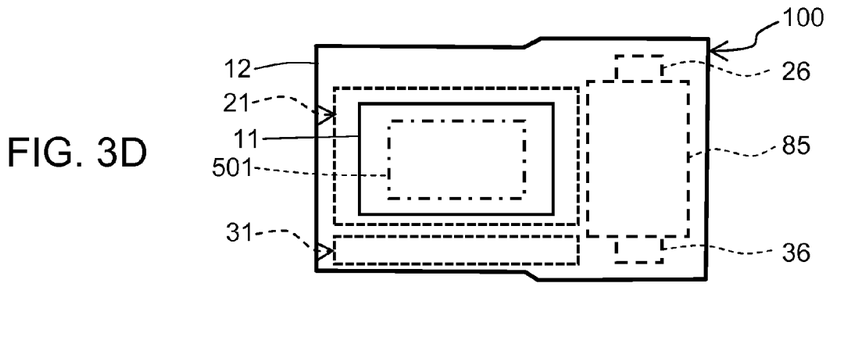

The operation of mechanical shutter 100 will be described when digital camera 10 performs the capturing operation with reference to FIGS. 3A to 3D. When digital camera 10 is in the image-recording mode, before accepting the pushing operation of release button 507 by the user, both rear curtain 21 and front curtain 31 are maintained in a state of being retracted from opening 11. At this time, mechanical shutter 100 becomes a state shown in FIG. 3A, and light that enters through opening 11 forms an image on CMOS sensor 501. When the user performs the full-push operation on release button 507, front curtain 31 covers opening 11 as shown in FIG. 3B. As a result, it becomes a state where the light does not reach CMOS sensor 501. After the mechanical operation when front curtain 31 covers opening 11 is stabilized, front curtain 31 and rear curtain 21 travel. At this time, as shown in FIG. 3C, rear curtain 21 travels so as to follow front curtain 31 by leaving a gap between front curtain 31 and rear curtain 21. It should be noted that when exposure time is set to be longer than a predetermined time, rear curtain 21 travels after the predetermined time from the travel of the front curtain 31 is completed. CMOS sensor 501 captures the object image from the gap between front curtain 31 and rear curtain 21. When the traveling operation is completed, rear curtain 21 is held so as to cover opening 11 as shown in FIG. 3D. As a result, it becomes a state where the light does not reach CMOS sensor 501. At this time, CPU 503 captures the image data from CMOS sensor 501. Digital camera 10 moves to the capturable state again after the capture of the image data is completed. When digital camera 10 is set in the continuous image-recording mode, while the user is performing the push operation on release button 507, the operation described above with reference to FIGS. 3A to 3D is repeated.

[2-2. Continuous Shooting Operation]

Figure 4:
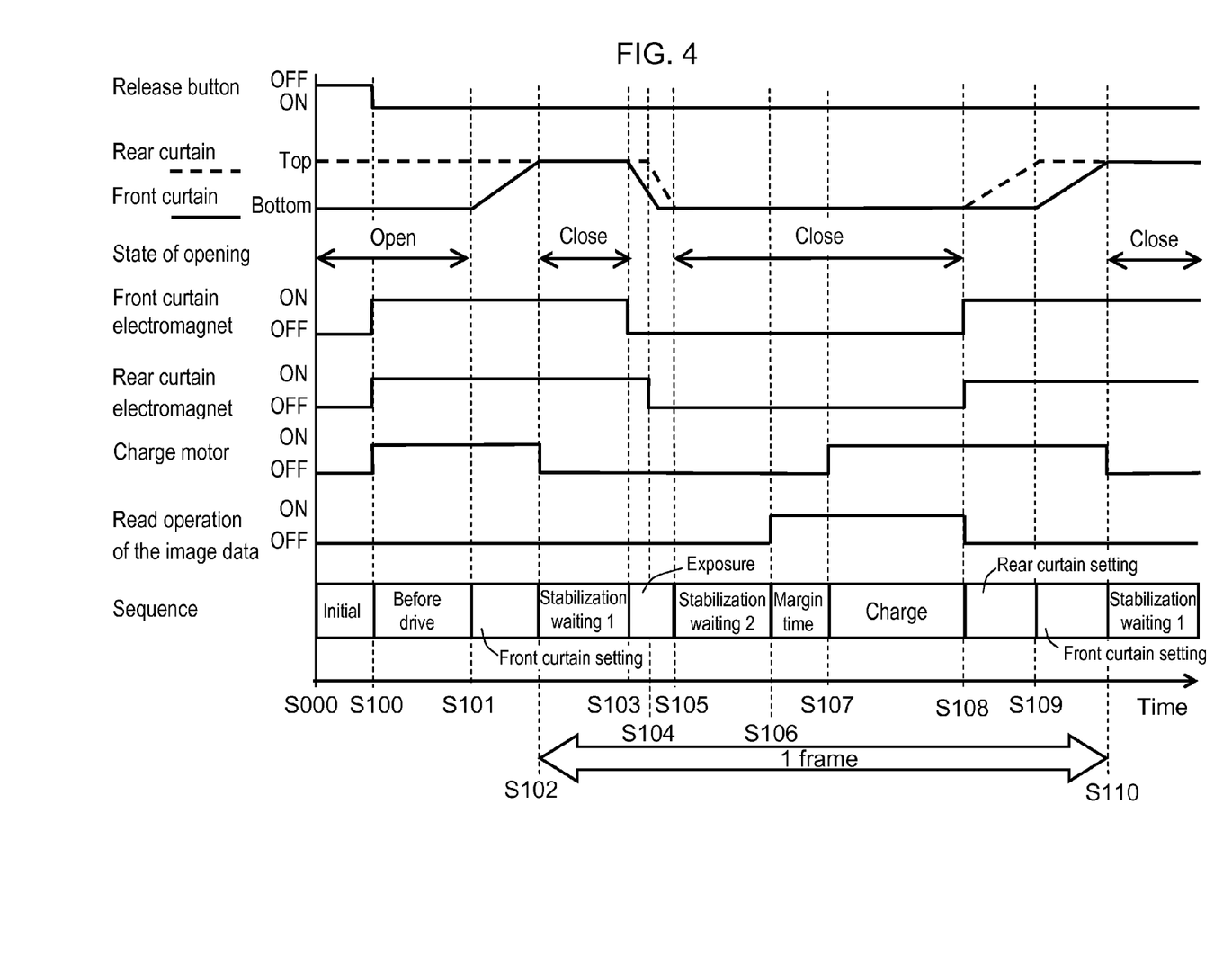
FIG. 4 is a time chart of the capturing operation of the digital camera in the first exemplary embodiment.

FIG. 4 is a time chart at the time of continuous shooting using mechanical shutter 100. When digital camera 10 is in the continuous image-recording mode, mechanical shutter 100 waits for the pushing of release button 507 from the user in the state where opening 11 is opened. At this time, digital camera 10 displays the through image obtained by CMOS sensor 501 on monitor 502 (time S000).

When the user pushes (ON) release button 507, front curtain electromagnet 36 and rear curtain electromagnet 26 become the energized state (ON) (time S100). In addition, at time S100, charge motor 201 also becomes the energized state (ON).

When charge motor 201 becomes the energized state, charge motor 201 starts the charge of shutter driving mechanism 85 (before drive). When the charge of shutter driving mechanism 85 is completed (time S101), shutter driving mechanism 85 drives front curtain 31, and sets front curtain 31 to the state of FIG. 3B (front curtain setting).

When the front curtain setting is completed (time S102), charge motor 201 performs a short brake. When front curtain 31 is set, front curtain 31 vibrates minutely even after the front curtain setting is completed because front curtain 31 is driven by shutter driving mechanism 85 that includes a spring. The minute vibration may affect the next operation, and therefore, after the front curtain setting is finished, CPU 503 waits for the front curtain to stabilize for a predetermined time (stabilization waiting 1). Here, the predetermined time is a time enough for the minute vibration of front curtain 31 to decay, and is a determined time in advance.

When front curtain 31 is stabilized, CPU 503 releases the energization to front curtain electromagnet 36 (time S103). When the energization to front curtain electromagnet 36 is released, front curtain 31 is released from the attraction holding state, and is retracted from opening 11 by shutter driving mechanism 85.

After a predetermined time (shutter speed) elapses, CPU 503 releases the energization to rear curtain electromagnet 26 (time S104). When the energization to rear curtain electromagnet 26 is released, rear curtain 21 is released from the attraction holding state, and closes opening 11 by shutter driving mechanism 85 (time S105).

During the period from time S103 to time S105, it becomes a state where part of opening 11 is not covered by front curtain 31 and rear curtain 21 as shown in FIG. 3C (exposure). Light is captured to CMOS sensor 501 through this part. In the present exemplary embodiment, the time required from time S103 to time S105 is referred to as "exposure time". The exposure time refers to a time from when the traveling of front curtain 31 starts to when the traveling of rear curtain 21 is finished. The exposure time is determined by the shutter speed that is determined by the setting and the like by the user, and the traveling speeds of front curtain 31 and rear curtain 21. It should be noted that the shutter speed usually refers to the time from when the traveling of front curtain 31 starts to when the traveling of rear curtain 21 starts (time S103 to time S104).

When front curtain 31 is fully retracted from opening 11, and rear curtain 21 blocks opening 11 completely (time S105), as shown in FIG. 3D, opening 11 becomes a state of being blocked by rear curtain 21. At this time, the light entering CMOS sensor 501 is cut off by rear curtain 21. During the exposure operation from time S103 to time S105, both front curtain 31 and rear curtain 21 are driven by shutter driving mechanism 85 including a spring. Therefore, front curtain 31 and rear curtain 21 vibrate minutely even after the exposure operation is completed. The minute vibration may affect the following operation, and therefore, CPU 503 waits for front curtain 31 and rear curtain 21 to stabilize for a predetermined time (stabilization waiting 2). Here, the predetermined time is a time enough for front curtain 31 and rear curtain 21 to be stabilized, and is a determined time in advance.

When front curtain 31 and rear curtain 21 are stabilized, CPU 503 starts (ON) the reading of the image data from CMOS sensor 501 (time S106). In parallel with the reading of the image data, after the lapse of a predetermined time (margin time), shutter driving mechanism 85 is charged by charge motor 201 in preparation for the capturing of the next frame (time S107). The operation from the end of the exposure operation (time S105) to the start of the charging operation (time S107) is a stand-by operation, and the stand-by operation includes the time for the stabilization waiting after the exposure operation and the margin time. The margin time from time S106 to time S107 will be described below. Here, the time required for the charge is the time determined by the mechanical factors when charge motor 201 charges shutter driving mechanism 85. The reading of image data is finished (OFF) before the charge is completed.

When the charge is completed, CPU 503 energizes front curtain electromagnet 36 and rear curtain electromagnet 26 (time S108). In addition, at this time, shutter driving mechanism 85 retracts rear curtain 21 from opening 11. When rear curtain 21 is retracted from opening 11, rear curtain 21 is attracted to and held in rear curtain electromagnet 26. Then, shutter driving mechanism 85 starts the setting of front curtain 31 (time S109) so as to cover opening 11. When the setting of front curtain 31 is completed (time S110), front curtain 31 is attracted to and held in the front curtain electromagnet. When the settings of rear curtain 21 and front curtain 31 are completed, CPU 503 waits for rear curtain 21 and front curtain 31 to stabilize by applying a short brake to charge motor 201 (stabilization waiting 1). That is, time S110 corresponds to time S102.

Here, the margin time (from time S107 to time S106) will be described. As described above, the charge time is a time determined by the mechanical factors. In addition, the sequence of mechanical shutter 100 is performed without any relationship with the reading of the image data. That is, regardless of whether the reading operation of the image data is finished, mechanical shutter 100 starts the setting of rear curtain 21 when the charge is finished. At this time, when the charge is finished before the reading of the image data is finished, and the setting of rear curtain 21 is started, CMOS sensor 501 detects the light during the reading of the image data. Then, there is a possibility that the image data during the reading is disturbed.

The margin time is set to prevent such a situation. The time required for reading the image data is determined by the format of the image data, and therefore, CPU 503 determines the margin time so that the reading of the image data is finished during the time (from time S106 to time S108) obtained by adding the margin time and the charge time.

While the user is pushing release button 507, digital camera 10 according to the present exemplary embodiment can perform the continuous shooting by repeating the operation from time S102 to time S110.

[2-3. Frame Speed Adjustment]

Digital camera 10 according to the present exemplary embodiment includes position sensor 400 (FIG. 1) determining the positions of front curtain 31 and rear curtain 21 at mechanical shutter 100. CPU 503 performs the control such as the driving of charge motor 201 based on the signal obtained from position sensor 400. Therefore, if the signal interval from position sensor 400 in each frame during the continuous shooting is always constant, the frame speed can be also said to be constant. In practice, however, the signal interval obtained from position sensor 400 changes each time the user uses digital camera 10 by various mechanical factors. The various mechanical factors include the load variation on mechanical shutter 100 due to the environmental temperature changes, and the load variation of shutter driving mechanism 85 due to the wear and the lack of grease of the gears in shutter driving mechanism 85. Due to these factors, it can be considered that as the user uses digital camera 10, the frame speed changes.

Figure 5:
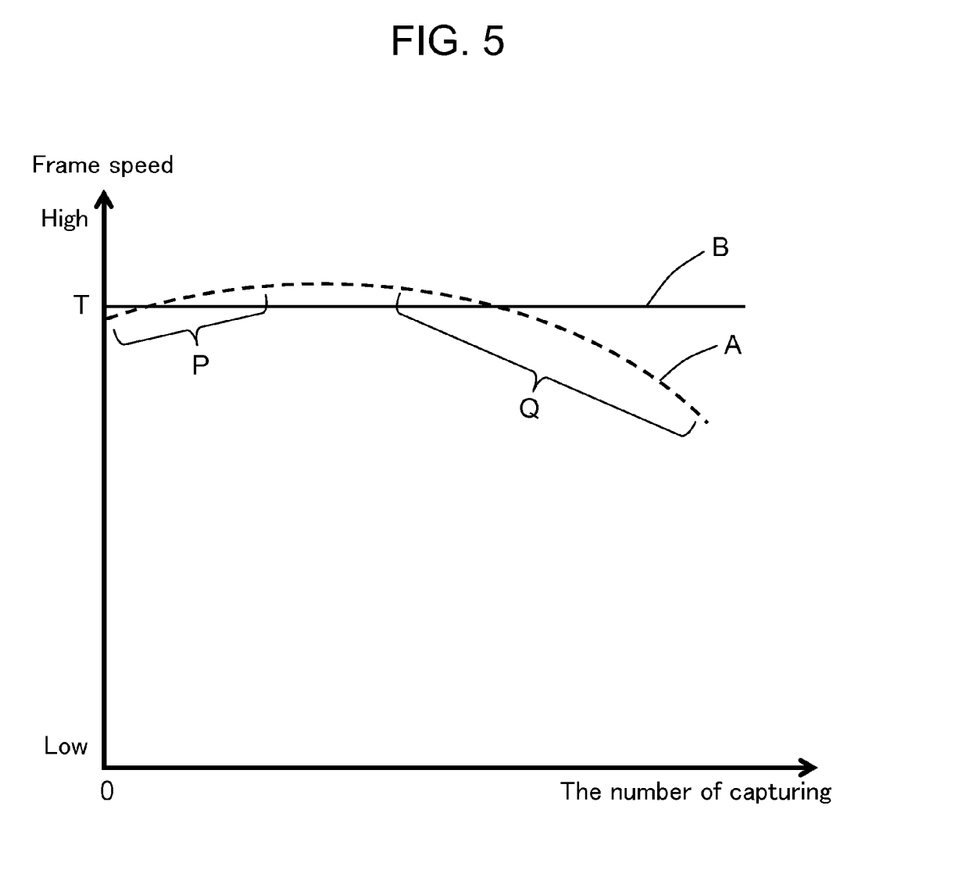
FIG. 5 is a schematic diagram illustrating the transition of the frame speed of the digital camera in the first exemplary embodiment.

FIG. 5 shows an example of the relation between the number of capturing and the frame speed of the continuous shooting. The capturing number is a capturing (shutter operation) number integrated from the factory shipment state. That is, the capturing number increases each time the user uses digital camera 10, and is rather than the value to be reset by, for example, dropping the power supply.

Line A in FIG. 5 is a modification when the frame speed is changed by the above-mentioned mechanical factors. Line A has area P where the frame speed is increased, and area Q where the frame speed is reduced. Area P appears immediately after the factory shipment. In area P, the frame speed is increased by the fit and the like of the grease applied to shutter driving mechanism 85. Area Q appears when the user performs a considerable number of capturing operations. In area Q, the frame speed is reduced due to the mechanical factors.

As shown in line A of FIG. 5, it is not preferable for the user that as the user uses digital camera 10, the frame speed of the continuous shooting changes. Then, it can be considered to drive and control charge motor 201, front curtain electromagnet 36, and rear curtain electromagnet 26 at a predetermined timing without using position sensor 400, and to obtain a constant frame speed T (line B in FIG. 5).

However, if charge motor 201, front curtain electromagnet 36, and rear curtain electromagnet 26 are driven and controlled at a predetermined timing without using position sensor 400, there is a possibility that a normal shutter operation cannot be performed. Specifically, it is considered that the time required for time S107 to time S110 shown in FIG. 4 is changed by the above-mentioned mechanical factors. In this case, if a short brake is put on charge motor 201 at a predetermined timing before the setting of front curtain 31 and rear curtain 21 is finished, front curtain 31 and rear curtain 21 are not completely set. That is, it is conceivable that the exposure operation is started without entering the state shown in FIG. 3B where front curtain 31 covers opening 11.

Then, digital camera 10 according to the present exemplary embodiment keeps the frame speed of the continuous shooting constant by adjusting the margin time provided during the capturing sequence.

In the following, the method of adjusting the time required to capture per frame during the continuous shooting will be specifically described with reference to FIG. 6. It should be noted that for simplicity of description, digital camera 10 is assumed to be set in the continuous image-recording mode.

Figure 6:
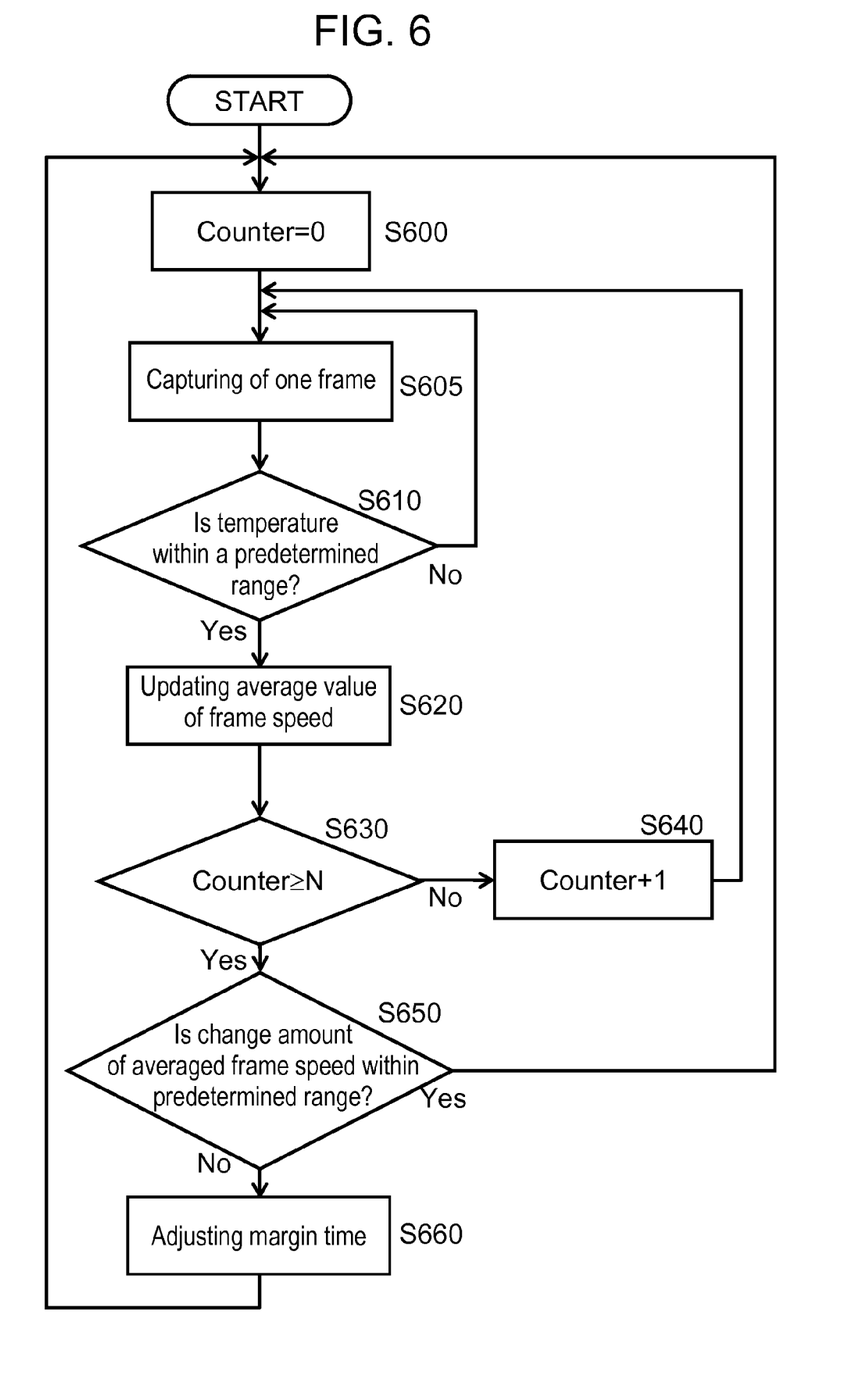
FIG. 6 is a flowchart illustrating the operation of the digital camera in the first exemplary embodiment.

FIG. 6 is a flowchart when the frame speed of the continuous shooting is adjusted. Digital camera 10 calculates the frame speed each time one frame is captured by using the time interval of the energization of front curtain electromagnet 36 and rear curtain electromagnet 26, each of which is detected by CPU 503. CPU 503 includes a counter function counting the continuous number that satisfies a predetermined condition. In addition, CPU 503 calculates the average of the calculated frame speed and records it according to a predetermined condition.

When the user performs the first continuous shooting, the value of the counter provided in CPU 503 is 0 (step S600). When the user pushes release button 507, digital camera 10 performs the continuous shooting operation while the user pushes the release button. When the user starts the continuous shooting, digital camera 10 performs the capturing of one frame (step S605). After the capturing of one frame, digital camera 10 measures the peripheral temperature by using temperature sensor 300 (step S610). When the peripheral temperature of digital camera 10 is not within a predetermined range (No in step S610), CPU 503 does not update the average value of the frame speed, and proceeds to the capturing operation of the next one frame. When the peripheral temperature is within a predetermined range (Yes in step S610), CPU 503 updates the average value of the frame speed by using a frame speed detected by the capturing operation of the most recent one frame (step S620). Specifically, if the average value of the past frame speed is denoted as t1, the number of data of the recorded frame speed as K, and the detected latest frame speed as t2, the average value tA of the updated frame speed is obtained by the following equation.

$$tA=(t1 \times K+t2)/(K+1)$$

Next, CPU 503 determines whether the value of the counter is a predetermined value N or more (step S630). When the value of the counter is less than the predetermined value N (No in step S630), CPU 503 increments the value of the counter by one (step S640).

When the value of the counter is the predetermined value N or more (Yes in step S630), CPU 503 determines whether the change amount of the averaged frame speed is within a predetermined range (step S650). Here, the change amount refers to the difference between the frame speed specified in digital camera 10 and the average value of the frame speed detected and calculated by the actual continuous shooting. When the change amount of the averaged frame speed is within a predetermined range (Yes in step S650), CPU 503 returns to step S600, discards the information of the integrated and recorded frame speeds, and resets the counter.

When the change amount of the averaged frame speed exceeds the predetermined range (No in step S650), CPU 503 adjusts the margin time provided during the capturing sequence (step S660). That is, the frame speed is adjusted by updating the margin time during the capturing sequence to a new margin time. When the frame speed is adjusted, CPU 503 returns to step S600, discards the information of the integrated frame speeds, and resets the counter. The above-described procedure is repeatedly performed each time of the continuous shooting.

Figure 7:
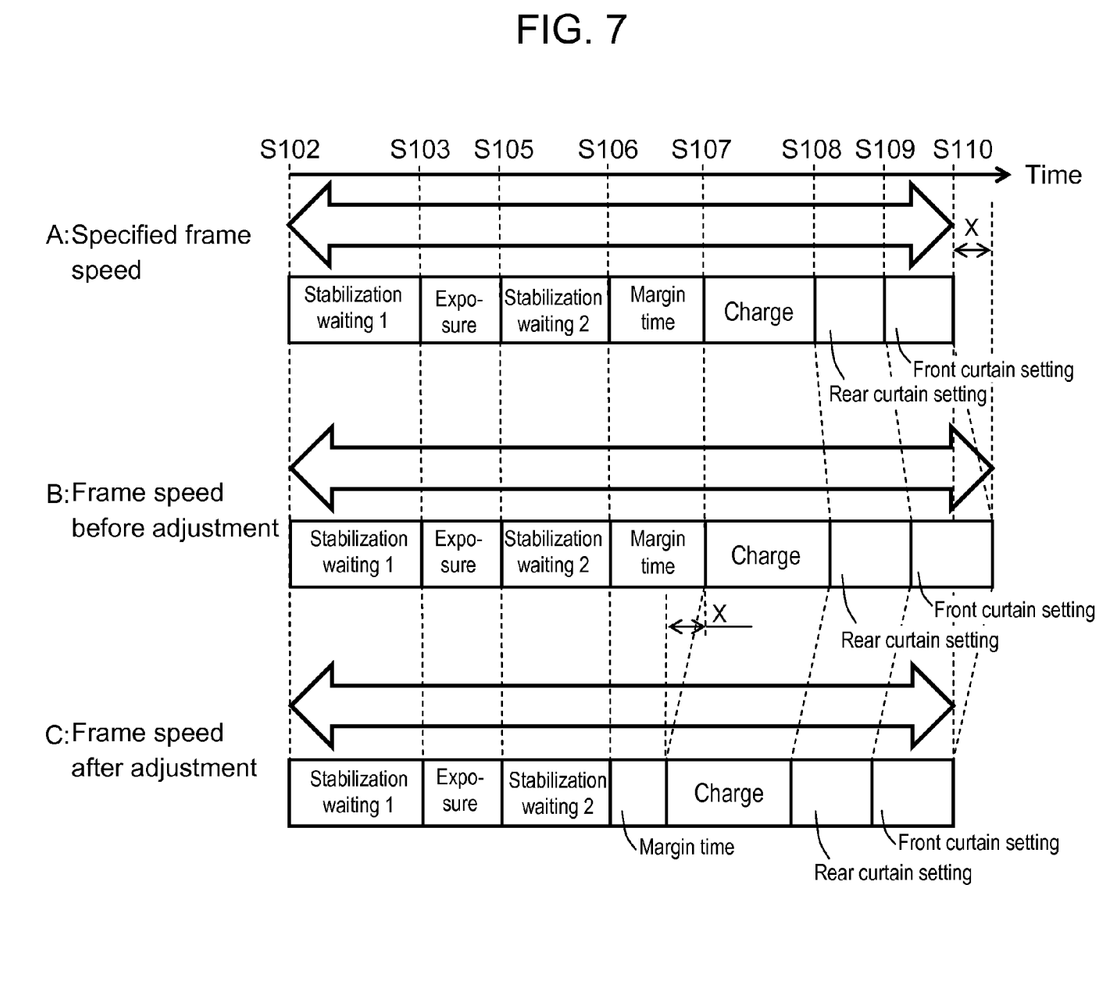
FIG. 7 is a diagram illustrating the adjustment of the frame speed of the digital camera in the first exemplary embodiment.

With reference to FIG. 7, the adjustment of the frame speed by adjusting the margin time will be specifically described. FIG. 7 shows each sequence in the cases of A: specified frame speed, B: frame speed before adjustment, and C: frame speed after adjustment. As shown in FIG. 5, when the capturing number exceeds a certain number of times, there is a tendency that the frame speed decreases. In the example shown in FIG. 7, in the sequence of the frame speed before adjustment, the time required for one frame of the sequence is the change amount X longer as compared with the case in the specified frame speed. In particular, the time required for the charge, the rear curtain setting, and the front curtain setting becomes longer, and thereby, the time required for one frame of the sequence becomes longer, and the frame speed decreases. Therefore, in the sequence after adjustment, a new margin time (new margin time) is set by subtracting the change amount X from the margin time (old margin time) in the sequence before adjustment. Thus, the time required for one frame capturing can be changed by the adjustment of the margin time. Then, the frame speed of the continuous shooting by the sequence after adjustment becomes the ideal frame speed specified in digital camera 10.

It should be noted that the above described adjustment of the margin time is desirable to be performed when digital camera 10 is in the stand-by state, rather than during the continuous shooting. This is to prevent the frame speed from changing halfway during the series of continuous shooting operation.

Here, the reason why temperature sensor 300 detects the peripheral temperature in step S610 in FIG. 6 will be described. Usually, when the peripheral temperature changes, the time required for the operation in mechanical shutter 100 also changes. When the peripheral temperature becomes lower than the predetermined temperature, the time required for the drive of mechanical shutter 100 becomes longer because, for example, the grease applied to each main part of mechanical shutter 100 is cured, and the like. As a result, the frame speed of the continuous shooting may decrease. In addition, when the peripheral temperature becomes higher than the predetermined temperature, for example, the motor torque of charge motor 201 is reduced; therefore, the time required for the charge becomes longer. As a result, the frame speed of the continuous shooting may decrease. Moreover, when the peripheral temperature is outside the predetermined range, the material itself of mechanical shutter 100 and the like may plastically deform by temperature change. As a result, the frame speed of the continuous shooting may change.

Thus, it is not appropriate to integrate even the information when the frame speed of the continuous shooting is changed naturally by the peripheral temperature, as the information for the frame speed adjustment, regardless of whether the user uses digital camera 10 for a long time, that is, of the capturing number. Therefore, digital camera 10 according to the present exemplary embodiment integrates the continuous frame speed at a time when the peripheral temperature is within a predetermined range as the information for the frame speed adjustment to average. As a result, the frame speed change amount depending on the peripheral temperature change is also suppressed to change as the user uses digital camera 10.

It should be noted that in digital camera 10 according to the present exemplary embodiment, each frame speed of the corresponding one frame is not recorded, and the frame speed of continuous shooting is not adjusted by using them, but, the counter number and the average value of frame speed is updated. Thereby, the memory for storing information required to adjust the frame speed of continuous shooting can be saved.

3. Effect, Etc.

Digital camera 10 according to the present exemplary embodiment can keep in a constant range the frame speed of continuous shooting which changes as the user uses digital camera 10.

4. Other Exemplary Embodiments

As described above, the first exemplary embodiment is described as the exemplary technology disclosed in the present application. However, the technology in the present disclosure is not limited to this, and can also be applied to the embodiments where change, replacement, addition, omission, and the like are performed. In addition, it is also possible to make a new embodiment by combining each component described in the first exemplary embodiment.

Then, in the following, other embodiments will be illustrated.

Although the frame speed is detected and integrated each time one frame capturing is performed until the counter reaches the predetermined amount N when the average value of the frame speed is obtained in the first exemplary embodiment, the present disclosure is not limited to this. It is also possible to detect and integrate the frame speed in every predetermined number of frames. In addition, when some only Y frames are newly captured, it is also possible to update the average value of the frame speed, for example, by discarding the oldest Y pieces of data of the accumulated information.

In addition, although the first exemplary embodiment includes the configuration to detect the peripheral temperature every time one frame capturing is performed when performing continuous shooting, the present disclosure is not limited to this. In a series of continuous shooting, it is acceptable that CPU 503 of the digital camera detects the temperature only immediately after the first frame is captured. In addition, it is acceptable that the digital camera records the frame speed by performing a series of continuous shooting by using the temperature previously detected before the continuous shooting is performed.

In addition, although the first exemplary embodiment includes the configuration that front curtain 31 is retracted below opening 11, and that rear curtain 21 is retracted above opening 11, the present disclosure is not limited to this. It is acceptable to have the configuration that front curtain 31 is retracted above opening 11, and that rear curtain 21 is retracted below opening 11. In addition, it is acceptable to have a single curtain configuration such as an electronic front curtain, and a mechanical rear curtain.

The present disclosure is applicable to a digital still camera, a movie, a mobile phone with a camera function, a smartphone, and the like.

What is claimed is:
1. An imaging apparatus for performing continuous shooting at a specified frame speed, the imaging apparatus comprising:
an imaging element configured to generate image data by imaging an object image;
a mechanical shutter configured to control an exposure for the imaging element;
a frame speed detector configured to detect a frame speed of the continuous shooting; and
a control section configured to perform control of a read operation of the image data and control of the mechanical shutter, wherein the control section adjusts the frame speed of the continuous shooting when a difference between the specified frame speed and the frame speed of the continuous shooting exceeds a predetermined range by adjusting a predetermined margin time provided during a capturing sequence of the continuous shooting.

2. The imaging apparatus according to claim 1,
wherein the mechanical shutter comprises:
   a curtain configured to cut off light to the imaging element;
   a driving mechanism configured to drive the curtain; and
   a motor configured to give a driving force to the driving mechanism,
wherein while the imaging apparatus is in the continuous shooting, the mechanical shutter repeatedly performs
   a charging operation that puts the driving mechanism into a drivable state,
   a setting operation that sets the curtain into a position to start exposing the imaging element after the charging operation,
   an exposure operation that exposes the imaging element after the setting operation, and
   a stand-by operation that stands by for a predetermined time after the exposure operation, and
wherein the control section adjusts the frame speed of the continuous shooting by adjusting the predetermined time when the difference between the specified frame speed and the frame speed of the continuous shooting exceeds the predetermined range.

3. The imaging apparatus according to claim 2,
wherein when the difference between the specified frame speed and the frame speed of the continuous shooting exceeds the predetermined range, the control section sets a new predetermined time by adjusting the predetermined time based on the difference between the specified frame speed and the frame speed of the continuous shooting, and
wherein the stand-by operation is performed by standing by for the new predetermined time.

4. The imaging apparatus according to claim 1,
further comprising a recording unit configured to record information necessary for a capturing operation,
wherein the control section causes the recording unit to record a frame speed detected by the frame speed detector.

5. The imaging apparatus according to claim 4,
further comprising a temperature detector,
wherein the control section causes the recording unit to record the frame speed only when a temperature detected by the temperature detector is within a predetermined range.

6. The imaging apparatus according to claim 4,
wherein the control section averages the frame speed detected by the frame speed detector and causes the recording unit to record the averaged frame speed.

7. The imaging apparatus according to claim 4,
wherein when the difference between the specified frame speed and the frame speed recorded in the recording unit exceeds the predetermined range, the control section sets a new predetermined time by adjusting the predetermined time based on the difference between the specified frame speed and the frame speed recorded in the recording unit, and
wherein the stand-by operation is performed by standing by for the new predetermined time.

\* \* \* \* \*